United States Patent
Van Haver et al.

(10) Patent No.: US 12,493,684 B2
(45) Date of Patent: Dec. 9, 2025

(54) MULTI-TENANT SECURE ELEMENT PLATFORM RUNTIME ENVIRONMENTS

(71) Applicant: Oracle International Corporation, Redwood Shores, CA (US)

(72) Inventors: Patrick Van Haver, La Cadiere d'Azur (FR); Nicolas Michel Raphaël Ponsini, Mougins (FR)

(73) Assignee: Oracle International Corporation, Redwood Shores, CA (US)

( * ) Notice: Subject to any disclaimer, the term of this patent is extended or adjusted under 35 U.S.C. 154(b) by 26 days.

(21) Appl. No.: 18/611,553

(22) Filed: Mar. 20, 2024

(65) Prior Publication Data

US 2025/0238498 A1 Jul. 24, 2025

Related U.S. Application Data

(60) Provisional application No. 63/624,547, filed on Jan. 24, 2024.

(51) Int. Cl.
| | | |
|---|---|---|
| G06F 21/51 | (2013.01) | |
| G06F 8/60 | (2018.01) | |
| G06F 9/455 | (2018.01) | |

(52) U.S. Cl.
CPC .............. *G06F 21/51* (2013.01); *G06F 8/60* (2013.01); *G06F 9/455* (2013.01)

(58) Field of Classification Search
CPC ............. G06F 21/51; G06F 9/455; G06F 8/60
See application file for complete search history.

(56) References Cited

U.S. PATENT DOCUMENTS

| | | | |
|---|---|---|---|
| 9,531,831 B1* | 12/2016 | Cuadrat | H04L 65/1073 |
| 10,326,744 B1* | 6/2019 | Nossik | H04L 63/0435 |
| 11,184,157 B1* | 11/2021 | Gueron | H04L 9/14 |

(Continued)

FOREIGN PATENT DOCUMENTS

EP 4290389 A2 12/2023

OTHER PUBLICATIONS

Souppaya, Murugiah, John Morello, and Karen Scarfone. Application container security guide. No. NIST Special Publication (SP) 800-190 (Draft). National Institute of Standards and Technology, 2017.*

(Continued)

*Primary Examiner* — Jimmy H Tran
(74) *Attorney, Agent, or Firm* — Invoke

(57) ABSTRACT

A system deploys an instance of a secure element (SE) application object to each of a plurality of secure containers of an SE platform runtime environment. The system generates an SE proxy application that includes an extension component that redirects to an executable component of an SE application installation file. The system additionally generates a secure container in the SE platform runtime environment. The secure container includes a partition that logically isolates the secure container from other secure containers of the SE platform runtime environment. The system deploys an SE application object to the secure container based on the extension component of the SE proxy application. Upon having deployed the SE application object to the secure container, the system executes the SE application object within the secure container.

20 Claims, 4 Drawing Sheets

(56) References Cited

U.S. PATENT DOCUMENTS

| | | | | |
|---|---|---|---|---|
| 2003/0061483 | A1* | 3/2003 | Schell | G06Q 20/383 |
| | | | | 713/166 |
| 2004/0103316 | A1* | 5/2004 | Gehrmann | H04L 63/065 |
| | | | | 713/176 |
| 2006/0265446 | A1* | 11/2006 | Elgressy | G06F 21/445 |
| | | | | 709/200 |
| 2007/0074032 | A1* | 3/2007 | Adams | G06F 21/629 |
| | | | | 713/176 |
| 2010/0332848 | A1* | 12/2010 | Adams | H04L 9/3247 |
| | | | | 713/189 |
| 2013/0347064 | A1* | 12/2013 | Aissi | G06F 21/53 |
| | | | | 726/2 |
| 2014/0047235 | A1* | 2/2014 | Lessiak | H04W 12/35 |
| | | | | 713/164 |
| 2014/0082056 | A1* | 3/2014 | Gargiulo | H04W 12/35 |
| | | | | 709/203 |
| 2014/0245400 | A1* | 8/2014 | Chen | H04L 65/70 |
| | | | | 726/4 |
| 2014/0317686 | A1* | 10/2014 | Vetillard | G06F 21/74 |
| | | | | 726/2 |
| 2014/0330869 | A1* | 11/2014 | Factor | G06F 21/6281 |
| | | | | 707/783 |
| 2014/0380403 | A1* | 12/2014 | Pearson | G06F 21/57 |
| | | | | 726/1 |
| 2015/0089586 | A1* | 3/2015 | Ballesteros | G06F 21/44 |
| | | | | 726/3 |
| 2015/0143484 | A1* | 5/2015 | Violleau | G06F 21/305 |
| | | | | 726/6 |
| 2015/0302398 | A1* | 10/2015 | Desai | G06Q 20/322 |
| | | | | 705/41 |
| 2015/0317493 | A1* | 11/2015 | Florez | G06F 21/6218 |
| | | | | 713/155 |
| 2015/0358161 | A1* | 12/2015 | Kancharla | H04L 63/0823 |
| | | | | 713/164 |
| 2016/0019536 | A1* | 1/2016 | Ortiz | G06Q 20/36 |
| | | | | 705/67 |
| 2016/0054772 | A1* | 2/2016 | Chai | G06F 1/3234 |
| | | | | 713/300 |
| 2016/0092176 | A1* | 3/2016 | Straub | G06F 8/34 |
| | | | | 717/107 |
| 2016/0092179 | A1* | 3/2016 | Straub | G06F 8/71 |
| | | | | 717/107 |
| 2016/0092180 | A1* | 3/2016 | Straub | G06T 11/60 |
| | | | | 715/762 |
| 2016/0092339 | A1* | 3/2016 | Straub | G06F 9/44521 |
| | | | | 717/124 |
| 2016/0092348 | A1* | 3/2016 | Straub | G06F 8/61 |
| | | | | 717/124 |
| 2016/0224768 | A1* | 8/2016 | Boccon-Gibod | G06F 21/62 |
| 2016/0308677 | A1* | 10/2016 | Thom | H04L 9/3234 |
| 2016/0344560 | A1* | 11/2016 | Caceres | H04W 12/04 |
| 2017/0109546 | A1* | 4/2017 | Nerot | G06F 21/51 |
| 2017/0124340 | A1* | 5/2017 | Chiu | H04L 67/10 |
| 2017/0201490 | A1* | 7/2017 | Kinder | H04L 63/0272 |
| 2017/0322934 | A1* | 11/2017 | Chen | G06F 9/50 |
| 2018/0025152 | A1* | 1/2018 | Ben Ali | G06F 21/6281 |
| | | | | 726/22 |
| 2018/0063091 | A1* | 3/2018 | Lancioni | H04L 63/205 |
| 2018/0159856 | A1* | 6/2018 | Gujarathi | H04L 63/0281 |
| 2018/0165673 | A1* | 6/2018 | Francis | H04W 4/80 |
| 2019/0058577 | A1* | 2/2019 | Bowman | H04L 9/06 |
| 2019/0089774 | A1* | 3/2019 | Prakash | H04L 67/1001 |
| 2019/0319800 | A1* | 10/2019 | Misoczki | H04L 9/0662 |
| 2019/0319807 | A1* | 10/2019 | Fairfax | H04L 9/3247 |
| 2019/0327096 | A1* | 10/2019 | Liu | H04L 9/30 |
| 2019/0392424 | A1* | 12/2019 | Wilson | G06Q 20/352 |
| 2020/0092096 | A1* | 3/2020 | Lacouture | H04L 9/0866 |
| 2020/0162247 | A1* | 5/2020 | Nix | H04L 9/0841 |
| 2020/0272737 | A1* | 8/2020 | Ji | G06F 21/57 |
| 2021/0117242 | A1* | 4/2021 | Van De Groenendaal | |
| | | | | H04L 67/1001 |
| 2021/0241268 | A1* | 8/2021 | Brown | G06Q 20/3821 |
| 2022/0100873 | A1* | 3/2022 | Yoon | G06F 21/575 |
| 2022/0116345 | A1* | 4/2022 | Xu | H04L 67/141 |
| 2022/0131708 | A1* | 4/2022 | Ghosh | H04L 9/3247 |
| 2022/0166771 | A1* | 5/2022 | Liu | H04L 9/3265 |
| 2022/0222347 | A1* | 7/2022 | Sheth | H04L 9/0869 |
| 2022/0239498 | A1* | 7/2022 | Sastry | H04L 9/0643 |
| 2022/0303283 | A1* | 9/2022 | Mansfield | H04L 63/08 |
| 2022/0350673 | A1* | 11/2022 | Velasco | G06F 9/50 |
| 2022/0350674 | A1* | 11/2022 | Velasco | G06F 9/5022 |
| 2022/0405392 | A1* | 12/2022 | Nix | H04L 9/3249 |
| 2023/0164214 | A1* | 5/2023 | Sheth | H04L 9/3263 |
| | | | | 709/224 |
| 2023/0283595 | A1* | 9/2023 | Sheriff | H04L 67/56 |
| | | | | 726/12 |
| 2024/0031164 | A1* | 1/2024 | Ghosh | H04L 9/50 |
| 2025/0065843 | A1* | 2/2025 | Bu | H04W 4/40 |
| 2025/0139255 | A1* | 5/2025 | Ponsini | G06F 21/85 |

OTHER PUBLICATIONS

Sultan, Sari, Imtiaz Ahmad, and Tassos Dimitriou. "Container security: Issues, challenges, and the road ahead." IEEE access 7 (2019): 52976-52996.*

"Java Card Platform Specification Release Notes", Version 3.2, Jan. 2023, pp. 10.

"Java Card™ Platform Runtime Environment Specification", Classic Edition, Version 3.2, Jan. 2023, pp; 1-36.

"Java Card™ Platform Virtual Machine Specification", Classic Edition Version 3.2, Jan. 2023, pp. 1-274.

"Java Card™ Platform, Application Programming Interface", Classic Edition Version , Retrieved on May 20, 2024, pp. 5.

* cited by examiner

MULTI-TENANT SECURE ELEMENT PLATFORM RUNTIME ENVIRONMENTS

INCORPORATION BY REFERENCE; DISCLAIMER

The following application is hereby incorporated by reference: application No. 63/624,547 filed on Jan. 24, 2024. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to deployment of applets within a secure element platform runtime environment. More particularly, the present disclosure relates to deployment of applets in multi-tenant, secure element platform runtime environments.

BACKGROUND

Secure element (SE) platform runtime environments are utilized for secure execution of small-footprint applications referred to as SE applications, or applets. One example of an SE platform runtime environment is a Java Card runtime environment. SE platform runtime environments may be deployed onto smart cards, SIM cards, or other embedded devices with limited resources. The SE platform runtime environment includes asset of application programming interfaces (APIs) that allow the applets to securely interact with underlying hardware to perform tasks such as cryptography, data storage, communication with external systems, and secure access control. These APIs may be standardized by Java Card specifications to ensure interoperability across different Java Card platforms. In accordance with these standards, each applet is deployed to a separate partition of the SE platform runtime environment that is logically isolated from other partitions. As such, multiple instances of a particular applet may be deployed to the same partition. For a multi-tenant environment, various tenants may prefer to securely execute an instance of a particular applet within a separate partition that is logically isolated from partitions utilized by other tenants.

The content of this background section should not be construed as prior art merely by virtue of its presence in this section.

BRIEF DESCRIPTION OF THE DRAWINGS

The embodiments are shown by way of example and not by way of limitation in the figures of the accompanying drawings. References to "an" or "one" embodiment in this disclosure are not necessarily to the same embodiment, and they mean at least one. In the drawings.

DETAILED DESCRIPTION

Figure 1A:
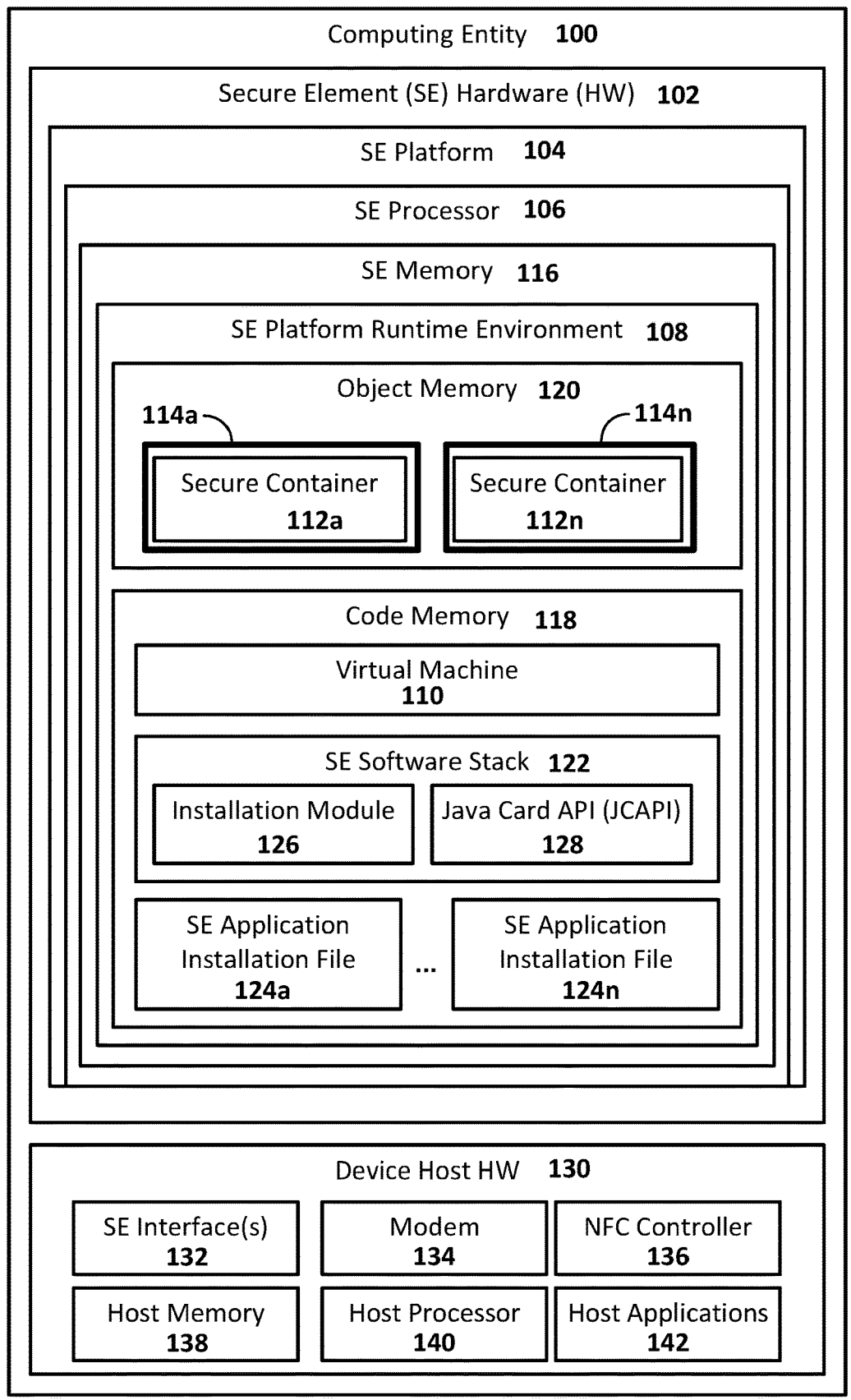
FIGS. 1A and 1B illustrate an example architecture of a computing system in accordance with one or more embodiments.

In the following description, for the purposes of explanation, numerous specific details are set forth to provide a thorough understanding. Detailed examples are described below for purposes of clarity. One or more embodiments may be practiced without these specific details. Components and/or operations described below should be understood as one specific example that may not be applicable to certain embodiments. Features described in one embodiment may be combined with features described in a different embodiment. In some examples, well-known structures and devices are described with reference to a block diagram form to avoid unnecessarily obscuring the present disclosure. Components and/or operations described below should not be construed as limiting the scope of any of the claims.

1. GENERAL OVERVIEW
2. EXAMPLE ARCHITECTURE
3. EXAMPLE OPERATIONS
4. COMPUTER NETWORKS AND CLOUD NETWORKS
5. MICROSERVICE APPLICATIONS
6. HARDWARE OVERVIEW
7. MISCELLANEOUS; EXTENSIONS

1. GENERAL OVERVIEW

A system deploys an instance of an SE application object to each of a plurality of secure containers of an SE platform runtime environment. Each instance of the SE application object may be executed within a respective secure container. Each secure container includes a partition that isolates the corresponding instance of the SE application object from outside sources such as other secure containers. The SE platform runtime environment may include a multi-tenant environment. In the multi-tenant environment, respective instances of the SE application object execute operations associated with a particular tenant. By logically isolating each tenant's instance of the SE application to a particular secure container, multiple tenants may utilize the SE platform runtime environment without exposing their data elements to other tenants of the multi-tenant environment.

The system may obtain an executable component from an SE application installation file, and based on the executable component, the system may deploy a first SE application object to a first secure container and a second SE application object to a second secure container. In one example, the system may generate an SE proxy application associated with the SE application installation file for each secure container where an instance of the SE application object may be deployed. In one example, the SE platform runtime environment may assign each executable component to a separate secure container, such that multiple instances of an SE application object corresponding to the same executable component may be deployed to the same secure container. In one example, the use of an SE proxy application allows for multiple instances of the SE application object to be deployed to separate secure containers from the same executable component. When the SE application objects are deployed via an SE proxy application, the SE platform runtime environment may perceive each SE proxy application to include a separate executable component. The SE proxy applications may include executable instructions that extend or redirect to the executable component in the SE application installation file.

In one example, each SE proxy application may extend the executable component of the SE application installation file, and each respective instance of the SE application object may be deployed from the respective SE proxy application to a corresponding secure container of the SE platform runtime environment. The system may deploy a first SE application object from a first SE proxy application to a first secure container. Concurrently or subsequently to deploying the first SE application, the system may deploy a second SE application object from a second SE proxy application to a second secure container. The first SE application object may execute operations associated with a first tenant of a multi-tenant environment, and the second SE application object may execute operations associated with a second tenant of the multi-tenant environment.

The system may deploy an instance of the executable component as an SE application object in response to a deployment request. The system may access an instruction that indicates whether to deploy an instance of the SE application object via an SE proxy application or directly from an SE application installation file. In a first scenario, an instruction specifies deployment of an instance of the executable component via an SE proxy application. In a second scenario, an instruction may specify deployment of an instance of the executable component directly from an SE application installation file. In one example, the instruction may be defined within the executable component. In another example, the instruction may be defined within the deployment request. In yet another example, the instruction may be determined based on a deployment mode module that determines whether a particular instance of the executable component is to be deployed via an SE proxy application or directly from the SE application installation file.

The system may terminate execution of a particular SE application object, while other SE application objects may continue executing operations within their respective secure containers. In one example, the system may terminate an instance of an SE application object in response to a trigger condition, such as a termination instruction or a period of inactivity. When execution of a particular SE application object is terminated, the system may delete the particular SE application object that is terminated. When a secure container no longer includes an SE application object, the system may delete the secure container and the corresponding SE proxy application. Additionally, the system may release a memory segment that includes a set of memory blocks allocated to the SE proxy application and a set of memory blocks allocated to the secure container and/or to the SE application object. The system may subsequently utilize the memory segment for additional instances of SE proxy applications, secure containers, and/or SE application objects.

This General Overview section is intended to provide a general overview without addressing every aspect of the present disclosure. The full scope of the presently disclosed subject matter is understood from the content of the present disclosure in its entirety.

2. EXAMPLE COMPUTING ENTITY ARCHITECTURE

Figure 1B:
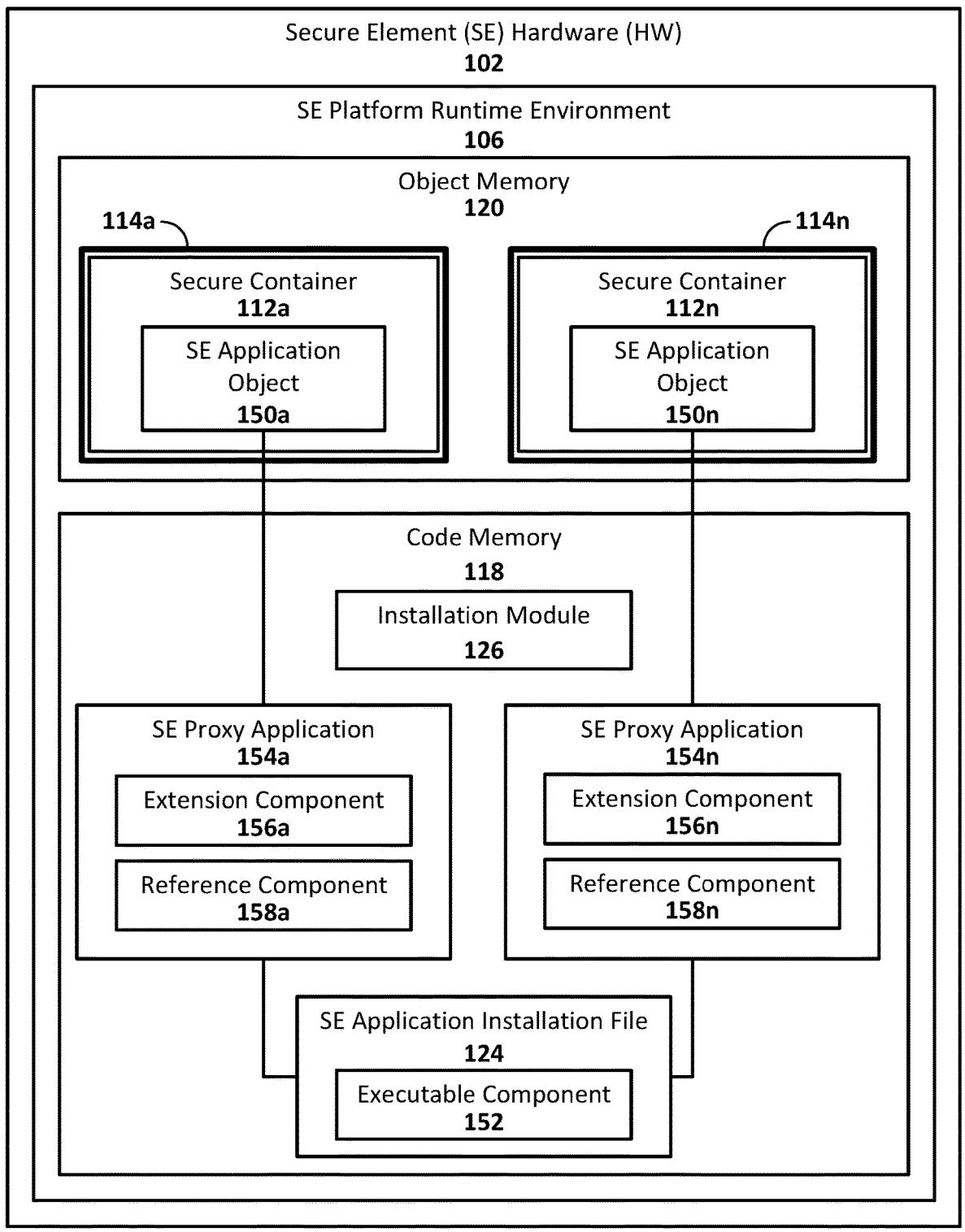

Referring now to FIGS. 1A and 1B, architecture of an example computing entity 100 is described. A computing entity may include more or fewer components than the components illustrated in FIGS. 1A and 1B, depending on the particular architecture.

As shown in FIG. 1A, the system architecture of a computing entity 100 includes SE hardware 102. SE hardware 102 may include a smart card such as a UICC (e.g., a SIM card). Additionally, or alternatively, SE hardware 102 may include other types of integrated circuit cards (ICCs) and tamper-resistant security chips that control access to secure resources. The SE hardware 102 may represent at least a portion of a SE platform 104. For example, an SE platform may include the SE hardware 102 and at least one additional hardware component. An example SE platform 104 is a Java Card platform. An SE platform 104, such as a Java Card platform, refers to an ecosystem or framework that enables the development, personalization, and/or execution of SE applications. An SE platform 104 may include the SE hardware 102 and other components utilized for deploying, personalizing, and/or executing SE applications.

A. Example SE Platform Runtime Environment Architecture

In one example, an SE platform 104, such as a Jaca Card platform, may include an SE processor 106. The SE processor 106 may include a microprocessor-based chip that may include hardware components for protecting secure data from unauthorized access and running secure applications. In one example, the SE processor 106 may include a microprocessor for executing a SE platform runtime environment 108. The SE platform runtime environment 108 may be executed on at least one SE processor 106. Various SE applications may be executed within the SE platform runtime environment 108. An example SE platform runtime environment 108 is Java Card Runtime Environment (JCRE). The JCRE provides a lightweight version of the Java Runtime Environment (JRE) that is tailored for smart cards and other tamper-resistant security chips to allow these SE hardware platforms to host SE applications, for example, employing Java technology. The SE processor 106 and/or the SE platform runtime environment 108 may represent a portion of the SE platform 104.

The SE platform runtime environment 108 may provide an execution environment for the SE applications. The SE platform runtime environment 108 may execute operations associated with SE applications, such as loading and unloading SE applications, scheduling SE application execution, isolating and securing SE applications, managing SE application memory, and/or managing interactions between SE application and underlying hardware. An SE application that is executable within the JCRE may be referred to as an applet or as a Java Card applet. The SE platform runtime environment 108 may include a firewall mechanism that isolates different applets on the smart card and a sharing mechanism that allows applets to explicitly make objects available to other applets.

The SE platform runtime environment 108 may include a virtual machine 110, such as a Java Card Virtual Machine (JCVM), that runs bytecode. The bytecode may be generated using a different encoding schema than the full JRE. SE platform runtime environment 108 and/or the virtual machine 110 may be implemented as firmware in object memory of the SE processor 106. The SE platform runtime environment 108 and the virtual machine 110 may work in tandem to provide a secure and controlled environment for executing SE applications. The SE platform runtime environment 108 may interact with the underlying components of the SE hardware 102 to manage the execution of SE applications. The SE platform runtime environment 108 may provide features to support execution of SE applications, including memory management, security mechanisms, loading and unloading of SE applications, and/or scheduling execution of SE applications. The virtual machine 110 may execute bytecode instructions of the SE applications.

The SE platform runtime environment 108 may include a plurality of secure containers 112, such as secure container 112a and secure container 112n. Multiple secure containers 112 operate as if multiple secure element chips have been installed within computing entity 100. For example, secure containers 112*a-n* may operate as if multiple embedded and/or removable SIM cards were currently operating within computing entity 100. Thus, secure containers 112*a-n* may correspond to virtual SIM cards and/or other tamper-resistant chips that share and are run from the same SE hardware components. SE hardware 102 and/or firmware running therein may include one or more partitions 114 that enforce isolation between different secure containers 112, for example, to prevent one secure container 112 from accessing the applets and code of another secure container 112. The partitions 114 may include a logical partition that logically isolate a secure container 112. Additionally, or alternatively, the partitions 114 may include a structural partition that structurally isolate a secure container 112. The partitions 114 may include a logical boundary that prevents unauthorized communication or interaction between respective secure containers 112. The logical boundary may be enforced through a firewall and/or a security protocol. The partitions 114 ensure that each secure container 112 provides a secure execution environment for executing SE applications. The partitions 114 shield the secure containers 112 from external tampering and ensures that sensitive operations executed within a secure container 112, such as cryptographic computations, are performed securely and cannot be compromised by external entities. The partitions 114 may be separate and distinct from the firewall mechanism of the SE platform runtime environment 108 previously mentioned. The firewall mechanism may be applied to a given secure container to maintain separation between different applets that are installed on the same secure container. The partitions 114 may be implemented at a lower level to maintain isolation between different secure containers. Each secure container may be configured with a firewall mechanism.

The SE hardware 102 may further include an SE memory 116. The SE memory 116 may represent at least a portion of the SE processor 106. The SE memory 116 may include code memory 118 and object memory 120. The SE platform runtime environment 108 may be implemented at least in part in the code memory 118 and at least in part in the object memory 120. The code memory 118 is generally utilized for static data structures of the SE platform 104. The object memory 120 is generally utilized for dynamic runtime data structures generated when executing the SE platform runtime environment 108. The SE memory 116, including the code memory 118 and the object memory 120, may represent a portion of the SE platform 104 and may be utilized by the SE processor 106 when executing the SE platform runtime environment 108. The virtual machine 110 utilized by the SE platform runtime environment 108 may represent a portion of the code memory 118.

The code memory 118 may include an SE software stack (SESS) 122 and one or more SE application installation files 124. The one or more SE application installation files 124 may include SE application installation file 124*a* and SE application installation file 124*n*. Each SE application installation file 124 may include one or more SE applications, or applets, that may be deployed to object memory 120 of the SE platform runtime environment 108. The SE application installation file 124*a* may include Jaca Card CAP files. A CAP file may include one or more executable components that respectively contain bytecode representing a SE application. One or more instances of an SE application object may be deployed to a secure container 112 based on a corresponding executable component. An SE application object represents an instance of an SE application that is instantiated, or installed, within the secure container. The information to create an instance of the SE application may be derived from the executable component. In one example, an SE application object may be deployed directly from an SE application installation file 124 to a secure container 112. Additionally, or alternatively, as described below with reference to FIG. 1B, an SE application object may be deployed to a secure container 112 via an SE proxy application.

The SESS 122 may include a set of components used to execute SE applications. SESS 122 may include code, referred to herein as SESS-code, that executes applets and provides a runtime environment for the applets. In one example, SESS 122 may include an installation module 126 and a Java Card API (JCAPI) 128. Additionally, or alternatively, SESS 122 may include other components, such as a JCVM, other APIs, and/or other components of the JCRE for hosting Java Card applications. The JCAPI 128 may include a set of software libraries, classes, and/or methods provided by the SE platform 104. SE applications may use the JCAPI 128 to interact with underlying components of the SE hardware 102 to execute various functionalities. In one example, the SESS-code is distinct from the code of applets and secure container applications. SESS-code provides a program and runtime environment for executing the secure container application code. For instance, the SESS-code may provide a virtual machine that runs secure container applets. Additionally, or alternatively, the SESS-code may manage access to the SE hardware components, such as crypto accelerators and memory segments, and/or perform memory management operations including allocating runtime memory for an applet that is currently running within the runtime environment. The SESS-code may be common to secure containers 112*a-n* to optimize for size and reduce processing overhead.

SE memory 116 may include one or more types of volatile and/or non-volatile storage, such as read-only memory (ROM), random-access memory (RAM), non-volatile memory (NVM), and one-time programmable (OTP) memory. SE memory 116 may store the data in an encrypted format. As described further below, the encryption scheme, such as the encryption algorithm and/or key location, may vary between different secure containers to provide data integrity and isolation. In one example, SE memory 116 securely stores data for secure containers 112*a-n*.

Referring further to FIG. 1A, the computing entity 100 may also include device host hardware 130. The device host hardware 130 may include SE interface 132, modem 134, near-field communication (NFC) controller 136, host memory 138, and host processor 140. Device host hardware 130 may run host applications 142.

In one example, switch commands and other messages originate from device host hardware 130. For example, messages may be received wirelessly through modem 134 and/or NFC controller 136. The messages may be routed to SE hardware 102 by SE interface 132. SE interface 132 may include a bus or other communication system for transferring messages from device host hardware 130 to SE hardware 102.

In one example, modem 134 is a mobile broadband modem that sends and receives messages via a mobile broadband connection. For example, carriers, including mobile network operators (MNOs) and mobile virtual network operators (MVNOs), may send network messages to a mobile phone wirelessly through modem 134 via a cellular network. Different secure containers may be targeted based on the mobile phone operator that sent the message. SE hardware 102 may support multiple virtual SIM cards from different mobile phone operators. Additionally, or alternatively, other messages received wirelessly through modem 134 may target different types of secure containers. Example secure container applications may include payment processing, biometric authentication, identity management, and mobile network communications.

In one example, NFC controller 136 receives near-field wireless messages from external devices. NFC communications may transmit data through inductive coupling between an antenna in NFC controller 136 and the external device when placed within a threshold distance. An NFC message may trigger an operation in a secure container. For example, a payment terminal may generate an NFC message to extract credit card information and/or other data during a transaction. The target secure container may securely store financial information of a mobile device user and include one or more applets for processing secure transactions initiated with a payment terminal. NFC messages may trigger other operations that may vary depending on the type of secure container application and SSP associated with the application.

Additionally, or alternatively, device host hardware 130 may include other components for receiving messages through wired or wireless interfaces. For example, device host hardware 130 may include a Bluetooth module, a Zigbee chip, a Wi-Fi card, an infrared receiver, a universal serial bus (USB) controller, and/or a serial communications interface. Messages received through such hardware components may serve as external triggers that initiate operations to switch between secure containers 112$a$-$n$ and access resources that have been mapped to the secure container.

Device host hardware 130 may further include host memory 138 and host processor 140 for executing host applications 142. For example, a smartphone may include a mobile processor and RAM for executing a mobile operating system and mobile phone applications. Processor 140 and host memory 138 may be physically separate from SE hardware 102 to protect against attacks if the security of computing entity 100 is compromised. SE hardware 102 may prevent host processor 140 from accessing secure data stored in SE memory 116.

In other embodiments, device host hardware 130 may include additional or fewer components. For example, some devices, such as smart credit cards and company badges, may not include a mobile processor, CPU, or memory external to the secure element. These devices may not execute applications other than the applets hosted by SE hardware 102. Thus, the architecture of device host hardware 130 may vary depending on the particular type of device.

The encoding schema of an SE platform runtime environment 108, such as the JCRE, may reduce the memory footprint of an application to optimize for the application for execution by SE hardware 102. An SE platform runtime environment 108 may include more constraints than host hardware 130. For example, the size of SE memory 116 may be much smaller than host memory 138, and the speed of SE processor 106 may be much slower than host processor 140. Further, the native instruction set architecture (ISA) of SE processor 106 may be smaller or otherwise different than the ISA of host processor 140. One optimization technique to account for the constraints is to divide an application's code into packages below a size threshold and to restrict the packages that programming language constructs that are available within the environment. Although some examples described herein relate to the JCRE, embodiments described herein may be implemented by other runtime environments that execute on smart cards and other tamper-resistant chips.

B. Example SE Application Object Deployment Architecture

Referring to FIG. 1B, example configurations of an SE hardware 102 are further described. As shown in FIG. 1B, the installation module 126 of the SE software stack 122 (FIG. 1A) may be executed in the SE platform runtime environment 108. Execution of the installation module 126 in the SE platform runtime environment 108 may include operations pertaining to deploying SE application objects 150 to secure containers 112 located in object memory 120 utilized by the SE platform runtime environment 108. Additionally, or alternatively, the installation module 126 may execute operations pertaining to terminating SE application objects 150 and/or deleting SE application objects 150, secure containers 112, SE proxy applications 154, and/or SE Application installation files 124. Additionally, or alternatively, the installation module 126 may execute operations pertaining to releasing object memory 120 associated with the SE application objects 150, the secure containers 112, the SE proxy applications 154, and/or the SE Application installation files 124. The installation module 126 may deploy SE application objects 150 to secure containers 112 from an SE application installation file 124. The SE application installation file 124 may include an executable component 152 that contains bytecode representing an SE application. One or more instances of an SE application object 150 may be deployed from the SE application.

In one example, a set of SE application objects 150 corresponding to an executable component 152 of an SE application installation file 124 may be deployed to a corresponding set of secure containers 112 via an SE proxy application 154. The installation module 126 may interact with an SE proxy application 154 as though the SE proxy application 154 were an SE application installation file 124. The SE proxy applications 154 may allow multiple instances of an SE application object 150 to be deployed to separate secure containers 112 from the same executable component 152. Additionally, or alternatively, an SE application object may be deployed directly from an SE application installation file 124 to a secure container 112, for example, when deploying multiple instances of the executable component 152 to a particular secure container 112.

The installation module 126 may generate a plurality of SE proxy applications 154, such as SE proxy application 154$a$ and SE proxy application 154$n$. In one example, the installation module 126 may generate an SE proxy application 154 associated with the SE application installation file 124 for each secure container 112. As shown in FIG. 1B, SE proxy application 154$a$ may be associated with secure container 112$a$, and SE proxy application 154$n$ may be associated with secure container 112$n$. SE application object 150$a$ may be deployed to secure container 112$a$ via SE proxy application 154$a$, and SE application object 150$n$ may be deployed to secure container 112$n$ via SE proxy application 154$n$. Secure container 112$a$ may be generated in response to an executable instruction to deploy SE application object 150$a$ via SE proxy application 154$a$. Additionally, or alternatively, secure container 112$n$ may be generated in response to an executable instruction to deploy SE application object 150$n$ via SE proxy application 154$n$. An SE application object 150 deployed directly from the SE application installation file 124 may be deployed to a pre-existing or newly generated secure container 112. As shown, the SE proxy applications 154 may be generated in the code memory 118. Additionally, or alternatively, the SE proxy applications 154 may be generated in the SE memory 116 and/or in the SE software stack 122 (FIG. 1A). As shown, the secure containers 112 may be generated in the object memory 120 and may represent a portion of the SE platform runtime environment 108.

In one example, an SE proxy application 154 may include a reference component 158 and an extension component 156. As shown in FIG. 1B, SE proxy application 154a includes reference component 158a and extension component 156a, and SE proxy application 154n includes reference component 158n and extension component 156n. A reference component 158 may include a reference to an SE application installation file 124.

The reference to the SE application installation file 124 may establish a dependency between the SE proxy application 154 and the SE application installation file 124. Additionally, or alternatively, the reference component 158 may identify a class in the executable component 152 of the SE application installation file 124 that is extended to an extension component of the SE proxy application 154.

The extension component 156 may establish an extension relationship between the SE application installation file 124 and the SE proxy application 154. The extension relationship may include a first class of the extension component 156 that includes an extension of a second class of the executable component 152. The extension component 156 may inherit a set of methods from the SE application installation file 124. Additionally, or alternatively, the extension component 156 may include one or more methods that are additional to the set of methods inherited from the SE application installation file 124. The extension component 156 of the SE proxy application 154 may include instructions that are executable to deploy an SE application object 150 to a secure container 112 associated with the SE proxy application 154. The SE application object 150 may be based on the set of methods inherited from the SE application installation file 124. Further, the SE application object may be based on one or more additional methods of the extension component 156. The SE application object 150 may be installed to a secure container 112 generated specifically for the SE proxy application object 154. In one example, the one or more methods of the extension component 156 may include a first install method that includes a redirect to a second install method of the executable component 152.

When the installation module 126 interacts with the SE proxy application 154, the extension component 156 may cause the installation module 126 to access or call the executable component 152 of the SE application installation file 124 via a redirect of the extension component 156 and to deploy an SE application object 150 to the secure container 112 associated with the SE proxy application 154. The SE application object 150 may be deployed to the secure container 112 based at least in part on an install method of the extension component 156. The SE application object 150 may be instantiated via the extension component 156 of the SE proxy application 154 based on the install method of the executable component 152. In one example, the executable component 152 of the SE application installation file 124 may include a first class that encapsulates bytecode representing a set of methods that may be installed in an SE application object 150. In one example, the extension component 156 of the SE proxy application 154 may include a second class that encapsulates bytecode that is executable to deploy the SE application object 150 in a secure container 112 associated with the SE proxy application 154. Additionally, or alternatively, the second class may encapsulate bytecode that is executable to call the first class from the executable component 152 of the SE application installation file 124 and to install the set of methods of the first class to the SE application object 150. Additionally, or alternatively, the second class may encapsulate bytecode that is executable to install one or more additional methods to the SE application object 150.

C. Example Message Exchange Systems

Referring further to FIGS. 1A and 1B, in one example, one or more computing entities 100 may represent at least part of a message exchange system. Each computing entity 100 may be configured to exchange encrypted messages via a wired or wireless connection. In one example, a plurality of computing entities 100 may be configured to connect to one or more data communication networks, such as a wireless network and/or a wired network. Example data communication networks include Global Systems for Mobile (GSM), Code Division Multiple Access (CDMA), Universal Mobile Telecommunication System (UMTS), Long Term Evolution (LTE), General Packet Radio Service (GPRS), Universal Mobile Telecommunications System (UMTS), Broadband Global Area Network (BGAN), wireless local area network (WLAN), Personal Area Networks (PAN), Local Area Networks (LAN), Metropolitan Area Networks (MAN), Wide Area Networks (WAN), Internet-of-Things (IoT) networks, Satellite Networks, cloud computing networks, or Ethernet networks. Example PAN networks may include Ultra-wideband networks, Bluetooth networks, Zigbee networks, Near-field communication networks. Example LAN networks may include Wi-Fi networks or WLAN networks. Example MAN networks may include Worldwide Interoperability for Microwave Access (WiMAX networks). Example WAN networks may include cellular networks (e.g., 2G, 3G, 4G, or 5G mobile networks). Example IoT networks may include Ultra-wideband networks, Matter networks, Zigbee networks, LoRa networks, or Sigfox networks.

The computing entities 100 may be different devices or different components of a particular device. The computing entities 100 may respectively include one or more digital devices. The term "digital device" refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a smart card, a personal digital assistant (PDA), a wireless receiver and/or transmitter, a base station, a communication management device, a router, a switch, a controller, an access point, and/or a browser device. In one example, a message exchange system may include one or more computing entities 100 that are smart cards and one or more computing entities 100 that are smart card readers.

In one example, a message exchange system may include a host device and a client device. The host device and/or the client device may respectively include a computing entity 100 configured as described with reference to FIGS. 1A and 1B. The client device may include a computing entity 100 configured as a smart card, such as an EMV card, or a universal integrated circuit card (UICC). A UICC is a smart card that conforms to the specifications defined by the European Telecommunications Standards Institute ETSI Smart Card Platform project. A subscriber identification module (SIM) card is an example of a UICC. The host device may include a computing device, such as a computing entity 100, that communicates with the client device. The host device may be a payment terminal and the client device may be a payment device, such as a payment card.

In one example, the client device may communicate with the host device via a contactless communication protocol such as a Near-field communication protocol. Additionally, or alternatively, the host device may include a slot configured to receive the client device. For example, a client device configured as a payment card may be inserted into a slot of a host device to communicatively couple the client device to the host device. As another example, the client device may be configured as a SIM card that is insertable into a slot of a host device. In yet another example, the client device may be configured as an embedded SE or an eSIM card that is wired to the host device. In yet another example, the client device may be integrated into the host device. As further examples, the client device may be configured as at least one of the following: a payment card, an access control card, an identity card, an electronic passport, a security identification card, a health insurance card, a transportation card, a secure USB token, an internet-of-things device, or a mobile telecommunications device.

3. EXAMPLE OPERATIONS

Figure 2:
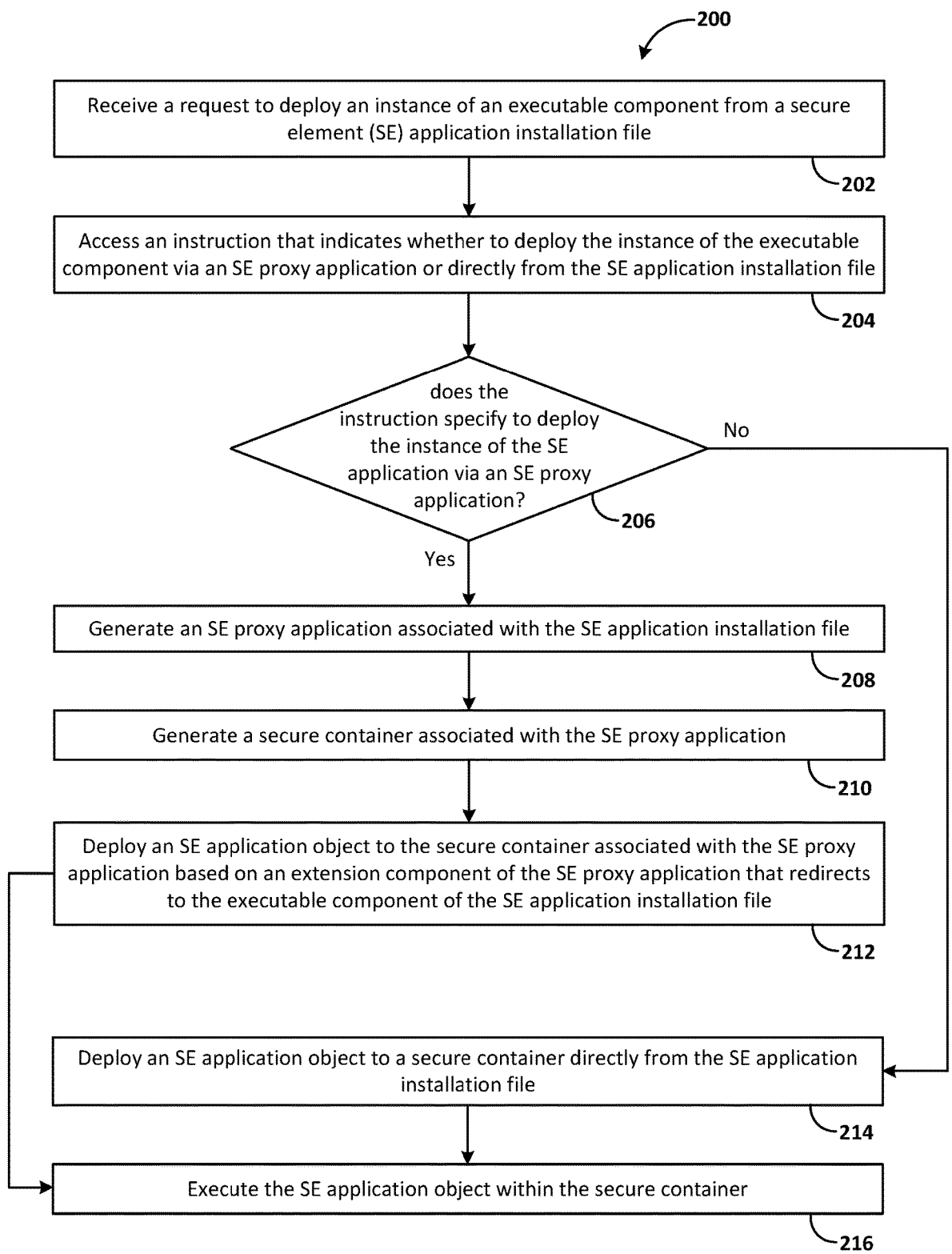
FIG. 2 shows a flowchart that illustrates example operations pertaining to deployment of secure element application objects.

Referring to FIG. 2, example operations 200 pertaining to encrypting messages are described. The operations 200 described with reference to FIG. 2 may be executed by a computing entity 100 described with reference to FIGS. 1A and 1B. For example, at least a portion of the operations 200 may be executed in an SE platform runtime environment, such as in one or more secure containers of the SE platform runtime environment. One or more operations 200 described with reference to FIG. 2 may be modified, rearranged, or omitted. Accordingly, the particular sequence of operations described with reference to FIG. 2 should not be construed as limiting the scope of one or more embodiments.

As shown in FIG. 2, the operations 200 may include, at block 202, receiving a request to deploy an instance of an executable component from an SE application installation file. The request may be received from a management system associated with the computing entity executing the SE platform runtime environment or from a trusted entity with appropriate permissions.

At block 204, the operations 200 may include accessing an instruction that indicates whether to deploy the instance of the executable component via an SE proxy application or directly from the SE application installation file. At block 206, the operations 200 may include determining whether or not the instruction specifies deployment of the instance of the SE application object via an SE proxy application. When the instruction specifies deployment of the instance of the SE application object via an SE proxy application, the operations may proceed to block 208. When the instruction does specify deployment of the instance of the SE application object via an SE proxy application, the operations may proceed to block 214. Additionally, or alternatively, the operations 200 may include determining whether the instruction specifies deployment of the instance of the SE application directly from the SE application installation file. When the instruction specifies deployment of the instance of the SE application directly from the SE application installation file, the operations may proceed to block 214. When the instruction does not specify deployment of the instance of the SE application directly from the SE application installation file, the operations may proceed to block 208.

In one example, the instruction may be defined within the executable component. In one example, the executable component may include an interface that extends an applet that provides an instruction as to whether the SE application element is to be deployed via an SE proxy application. The applet may provide the indication to an installation module that indicates whether or not the SE application element is to be deployed via an SE proxy application. Additionally, or alternatively, the installation module may query the applet to determine whether the SE application element is to be deployed via an SE proxy application.

In one example, the instruction may be defined within the request to deploy the instance of the executable component. In one example, the instruction may be defined within bytecode representing the request. In one example, different types of requests may be utilized to indicate to the installation module whether the SE application element is to be deployed via an SE proxy application or directly from the SE application installation file.

In one example, the instruction may be determined by a deployment mode module, for example, based on a set of one or more criteria associated with the request to deploy the instance of the executable component. In one example, the installation module may transmit a query to the deployment mode module, and subsequent to transmitting the query, the installation module may receive the instruction from the deployment mode module. The deployment mode module may receive the query, and responsive to receiving the query, the deployment mode module may determine whether the instance of the executable component is to be deployed via the SE proxy application. When the deployment mode module determines that the instance of the executable component is to be deployed via the SE proxy application, the deployment mode module may output a first indication. The first indication may indicate that the instance of the executable component is to be deployed via the SE proxy application. Additionally, or alternatively, when the deployment mode module determines that the instance of the executable component is to be deployed directly from the SE application installation file, the deployment mode module may output a second indication. The second indication may indicate that the instance of the executable component is to be deployed directly from the SE application installation file.

At block 208, the operations 200 may include generating an SE proxy application associated with the SE application installation file. In one example, the installation module may generate the SE proxy application based on an executable file that includes bytecode representing the SE proxy application. In one example, generating the SE proxy application may include allocating a first set of memory blocks to the first SE proxy application. The first set of memory blocks may be located in SE memory such as in code memory. In one example, generating the SE proxy application may include installing the SE proxy application in memory associated with a secure container such as the first set of memory blocks allocated to the SE proxy application. The SE proxy application may occupy at least a portion of the first set of memory blocks. Additionally, or alternatively, objects generated by the SE proxy application may occupy at least a portion of the first set of memory blocks.

At block 210, the operations may include generating a secure container associated with the SE proxy application. In one example, the installation module may generate the secure container based on an executable file. In one example, generating the secure container may include allocating a set of object memory blocks to the secure container.

The set of object memory blocks may be located in object memory utilized by the SE platform runtime environment. The secure container may occupy at least a portion of the set of object memory blocks. In one example, generating the secure container may include configuring a partition that logically isolates the secure container. The partition may occupy at least a portion of the set of object memory blocks. Additionally, or alternatively, an SE application object deployed to the secure container may occupy at least a portion of the set of object memory blocks.

At block 212, the operations 200 may include deploying an SE application object to the secure container associated with the SE proxy application. The SE application object may be deployed to the secure container based on an extension component of the SE proxy application. The extension component may redirect to the executable component of the SE application installation file. In one example, deploying the SE application object to the secure container may include calling the executable component of the SE application installation file and determining a set of methods that are extended to the extension component. Additionally, or alternatively, deploying the SE application object to the secure container may include installing the set of methods of the executable component to the SE application object. In one example, deploying the SE application object to the secure container may additionally include installing one or more additional methods of the executable component to the SE application object. In one example, deploying the SE application object to the secure container may include allocating portion of the secure container to the SE application object. The SE application object may occupy at least a portion of the secure container. Additionally, or alternatively, objects generated by the SE application object may occupy at least a portion of the secure container.

At block 214, the operations 200 may include deploying the SE application object to a secure container directly from the SE application installation file to the secure container. In one example, at block 214, the operations 200 may include determining whether a secure container associated with the SE application installation file exists in object memory. The secure container associated with the SE application installation file may be separated by a partition from one or more additional secure containers associated with one or more SE proxy applications. When a secure container associated with the SE application installation file exists in object memory, the operations 200 at block 214 may include selecting the secure container for deploying the SE application object directly from the SE application installation file. When a secure container has yet to be generated in association with the SE application installation file, the operations 200 at block 214 may include generating a secure container in object memory in association with the SE application installation file and deploying the SE application object to the secure container directly from the SE application installation file. In one example, the installation module may generate the secure container based on an executable file. In one example, generating the secure container may include allocating a set of object memory blocks to the secure container. The set of object memory blocks may be located in object memory utilized by the SE platform runtime environment. The secure container may occupy at least a portion of the set of object memory blocks. In one example, generating the secure container may include configuring a partition that logically isolates the secure container. The partition may occupy at least a portion of the set of object memory blocks. Additionally, or alternatively, an SE application object deployed to the secure container may occupy at least a portion of the set of object memory blocks.

In one example, deploying an SE application object to a secure container at block 212 or block 214 may include at least one of the following: extending the executable component from the SE application installation file to the secure container, installing the SE application object on the secure container, or activating the SE application object for execution within the secure container. In one example, extending an SE application object to a secure container may include transmitting the executable component to the secure container such as in the form of a Java Card CAP file. Additionally, or alternatively, extending an SE application object to the secure container may include storing the executable component in SE memory associated with the secure container. In one example, installing the SE application object on the secure container may include allocating memory for the SE application object, loading bytecode that represents the SE application object on memory associated with the secure container, and configuring the SE application object to prepare the SE application object for activation. Additionally, or alternatively, installing the SE application object on the secure container may include verifying one or more security protocols associated with the SE application object. In one example, activating the SE application object for execution within the secure container may include defining one or more parameters of the SE application object to allow the SE application object to receive commands and/or execute operations within the secure container. These commands may be sent from other components of the computing entity that is hosting the SE platform runtime environment and/or from external devices or systems.

Upon having deployed the SE application object to a secure container at block 212 or at block 214, the operations may proceed to block 216. At block 216, the operations 200 may include executing the SE application object within the secure container. In one example, executing the SE application object at block 216 may include executing operations associated with security, cryptographic processes, data management, or communication. In one example, an SE application object may execute cryptographic operations, such as encryption, decryption, generation or verification of digital signatures, or key generation. Additionally, or alternatively, an SE application object may execute operations pertaining to data storage and management, such as secure data storage, and/or defining and enforcing access control policies associated with access to stored data. Additionally, alternatively, an SE application object may execute operations pertaining to secure communications, such as implementing and managing security protocols, or sending and receiving messages between the SE platform runtime environment and external components, devices, or systems. Additionally, or in the alternative, an SE application object may execute operations pertaining to authentication and/or authorization processes, such as verifying identities, and/or granting or denying access to services or data. Additionally, or alternatively, an SE application object may execute operations pertaining to processing of transactions, such as secure payment transactions, or secure access to services. Additionally, or alternatively, an SE application object may execute operations pertaining to management of life cycles of other SE applications, such as installation, activation, deactivation, deletion, and/or updates of SE applications (applets) securely. Additionally, or alternatively, an SE application object may execute operations pertaining to secure execution of code within the SE platform runtime environment.

In one example, subsequent to executing an SE application object within the secure container, the operations 200 may include terminating execution of the SE application object and/or deleting the SE application object. In one example, the operations 200 may include terminating execution of the SE application object. Additionally, or alternatively, the operations 200 may include deleting the SE application object from the secure container. In one example, when the secure container no longer includes any SE application objects, the operations 200 may include deleting the secure container and the corresponding SE proxy application. In one example, the secure container and the corresponding SE proxy application may be deleted at least in part responsive to deleting the SE application object from the secure container.

In one example, the operations 200 may include releasing a set of one or more memory segments, including the first set of memory blocks allocated to the SE proxy application and the second set of memory blocks allocated to the SE application object. The set of one or more memory segments may be released subsequent to deleting the secure container and the corresponding SE proxy application. The set of one or more memory segments, once released, may be available for other operations or future instances of SE application objects. Additionally, or alternatively, the operations 200 may include deallocating resources associated with the SE application object. The allocation of resources may include releasing any hardware resources, cryptographic keys, or other allocated elements specific to the terminated SE application object. After deallocating resources associated with the SE application object, memory segments associated with the SE application object and/or the SE proxy application may be released.

Termination of the SE application object may be triggered based on one or more events or conditions, such as end of usage, an SE reset, an administrative command, a user input, an expiration criteria, and/or a security policy change. In one example, an SE application object may be terminated when its functionality is no longer needed or when its intended purpose has been fulfilled. For example, if a specific service provided by the SE application object is no longer required, the SE application object may be terminated. Additionally, or alternatively, an SE application object may be terminated in the event that the SE platform runtime environment is reset or reinitialized. Additionally, or alternatively, an SE application object may be terminated based on a trigger initiated by a system administrator or an authorized entity, for example, as part of system maintenance or management activities. Additionally, or alternatively, an SE application object may be terminated based on an expiration criterion, such as a predefined expiration time, a time-based conditions, or one or more criteria associated with the SE application runtime environment. When such criteria are met, the SE application object may be terminated automatically. Additionally, or alternatively, an SE application object may be terminated based on a change to a security policy, an access control, or a configuration of the SE platform runtime environment.

In one example, the operations 200 may include generating a first SE proxy application and a first secure container associated with the first SE proxy application, and generating a second SE proxy application and a second secure container associated with the second SE proxy application. Additionally, the operations 200 may include deploying a first SE application object to the first secure container based on a first extension component of the first SE proxy application. The first extension component may extend an executable component of an SE application installation file. Additionally, the operations 200 may include deploying a second SE application object to the second secure container based on a second extension component of the second SE proxy application that extends the executable component of the SE application installation. The first secure container may include a first partition that logically isolates the first secure container from at least the second secure container. Additionally, the second secure container may include a second partition that logically isolates the second secure container from at least the first secure container. Execution of the first SE application object may correspond to a first set of operations associated with a first tenant of a multi-tenant environment, and execution of the second SE application object may correspond to a second set of operations associated with a second tenant of the multi-tenant environment. The second SE proxy application and the second secure container may be generated concurrently with, or subsequent to, generation of the first SE proxy application and the first secure container. Additionally, or alternatively, the second SE application object may be deployed concurrently with, or subsequent to, deployment of the first SE application object.

In one example, the operations 200 may include receiving a command to delete the SE application installation file. In response to receiving the command to delete the SE application installation file, the system may delete the SE application installation file and each SE proxy application and each secure container associated with the SE application installation file. In one example, the system may receive a command to delete the SE application installation file when the object memory includes a first SE application object deployed to a first secure container and a second SE application object deployed to a second secure container. In response to the command to delete the SE application installation file, the system may delete the first SE application object, the first secure container, and the first SE proxy application. Additionally, the system may delete the second SE application object, the second secure container, and the second SE proxy application. Additionally, the system may delete the SE application installation file.

In one example, the operations 200 may include receiving a request to deploy an additional instance of the executable component and determining an additional instruction indicating to deploy the additional instance of the executable component directly from the SE application installation file. Responsive to determining the additional instruction, the operations 200 may include deploying, directly from the SE application installation file to the additional secure container, an additional SE application object based on the executable component in the SE application installation file. The operations 200 may further include executing the additional SE application object within the additional secure container. The additional secure container may include an additional partition that isolates the additional secure container from one or more additional secure containers. The additional SE application object may be deployed prior to, concurrently with, or subsequent to deployment of an SE application object to a secure container associated with an SE proxy application.

In one example, the operations 200 may include terminating execution of the first SE application object and releasing a set of one or more memory segments, including a first set of memory blocks allocated to the first SE proxy application and a second set of memory blocks allocated to the first SE application object. Subsequent to terminating execution of the first SE application object, the operations 200 may include generating an additional SE proxy application associated with the SE application installation file. Further, the operations 200 may include extending the executable component from the SE application installation file to the additional SE proxy application and deploying an additional SE application object to an additional secure container based on the executable component. The operations 200 may further include executing the additional SE application object within the additional secure container. The additional secure container may include an additional partition that isolates the additional secure container from at least the second secure container.

Additionally, or alternatively, the operations 200 may include deploying one or more additional SE application objects to the first secure container and/or to the second secure container. The one or more additional SE application objects deployed to the first secure container may be executed within the first secure container. In one example, a plurality of SE application objects deployed to a particular secure container may interact with one another. Additionally, or alternatively, a plurality of SE application objects deployed to a particular secure container may be isolated from one another within the particular secure container by a firewall mechanism of the secure container. In one example, execution of the plurality of SE application objects may correspond to various operations of a particular tenant of a multi-tenant environment. In one example, execution of a first SE application object within a particular secure container may correspond to operations associated with a first service utilized by the tenant, and execution of a second SE application object within the particular secure container may correspond to operations associated with a second service utilized by the tenant.

In one example, the operations 200 may include deploying a first SE application object and a second SE application object to a secure container via an SE proxy application, and executing the first SE application object and the second SE application object in the secure container. In one example, the operations 200 may include terminating execution of the first SE application object while the second SE application object remains deployed in the secure container. The operations 200 may include continuing execution of the second SE application object. In one example, the first SE application object may be deleted from the secure container while the second SE application object remains deployed and/or executing in the secure container. The operations 200 may include refraining from deleting the secure container and the SE proxy application based at least in part on the second SE application object being deployed and/or executing in the secure container. Additionally, or alternatively, responsive at least in part to deleting the first SE application object from the secure container, the operations 200 may include determining that the second SE application object is still deployed to and/or executing in the secure container. Responsive to determining that the second SE application object is still deployed to and/or executing in the secure container, the operations 200 may include refraining from deleting the secure container and the SE proxy application.

8. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including, but not limited to, Software-as-a-Service (SaaS), Platform-as-a-Service (PaaS), and Infrastructure-as-a-Service (IaaS). In SaaS, a service provider provides end users the capability to use the service provider's applications that are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including, but not limited to, a private cloud, a public cloud, and a hybrid cloud. In a private cloud, network resources are provisioned for exclusive use by a particular group of one or more entities. The term "entity" as used herein refers to a corporation, organization, person, or other entity. The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource when the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset when the tenant and the particular application, data structure, and/or dataset are associated with a same tenant ID.

As an example, each database implemented by a multi-tenant computer network may be tagged with a tenant ID. A tenant associated with the corresponding tenant ID may access data of a particular database. As another example, each entry in a database implemented by a multi-tenant computer network may be tagged with a tenant ID. A tenant associated with the corresponding tenant ID may access data of a particular entry. However, the database may be shared by multiple tenants.

In an embodiment, a subscription list identifies a set of tenants, and, for each tenant, a set of applications that the tenant is authorized to access. For each application, a list of tenant IDs of tenants authorized to access the application is stored. A tenant is permitted access to a particular application when the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may be transmitted to other devices within the same tenant overlay network. Encapsulation tunnels are used to prohibit any transmissions from a source device on a tenant overlay network to devices in other tenant overlay networks. Specifically, the packets received from the source device are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

9. MICROSERVICE APPLICATIONS

According to one or more embodiments, the techniques described herein are implemented in a microservice architecture. A microservice in this context refers to software logic designed to be independently deployable with endpoints that may be logically coupled to other microservices to build a variety of applications. Applications built using microservices are distinct from monolithic applications that are designed as a single fixed unit and may include a single logical executable. With microservice applications, different microservices are independently deployable as separate executables. Microservices may communicate using Hyper-Text Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively, or additionally, provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged into the microservices manager, for example, with user-supplied application credentials to the manager without requiring reauthentication each time the managed application is used alone or in combination with other applications.

In one or more embodiments, microservices may be connected via a Graphical User Interface (GUI). For example, microservices may be displayed as logical blocks within a window, a frame, or other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.).

Triggers

The techniques described above may be encapsulated into a microservice according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, may output a binary value indicating the trigger has been satisfied. Additionally, or alternatively, the trigger may output the name of the field or other context information pertaining to the trigger. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data that causes data to be moved into a data cloud.

In one or more embodiments, the exposed actions may receive, as input, a request to increase or decrease existing alert thresholds. The input might access existing in-application alert thresholds and whether to increase, decrease, or delete the threshold. Additionally, or alternatively, the input might request the microservice application to create new in-application alert thresholds. The in-application alerts may trigger alerts to the user while logged into the application, or the in-application alerts may trigger alerts to the user using default or user-selected alert mechanisms available within the microservice application itself rather than through other applications plugged into the microservices manager.

In one or more embodiments, the microservice application may generate and provide an output based on input that identifies, locates, or provides historical data and defines the extent or scope of the requested output. The action, when triggered, causes the microservice application to provide, store, or display the output, for example, as a data model or as aggregate data that describes a data model.

10. HARDWARE OVERVIEW

According to one embodiment, the techniques described herein are implemented by one or more special-purpose computing devices. The special-purpose computing devices may be hard-wired to perform the techniques. Additionally, or alternatively, the special-purpose computing devices may include digital electronic devices such as one or more application-specific integrated circuits (ASICs), field programmable gate arrays (FPGAs), or network processing units (NPUs) that are persistently programmed to perform the techniques. Additionally, or alternatively, the special-purpose computing devices may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 3:
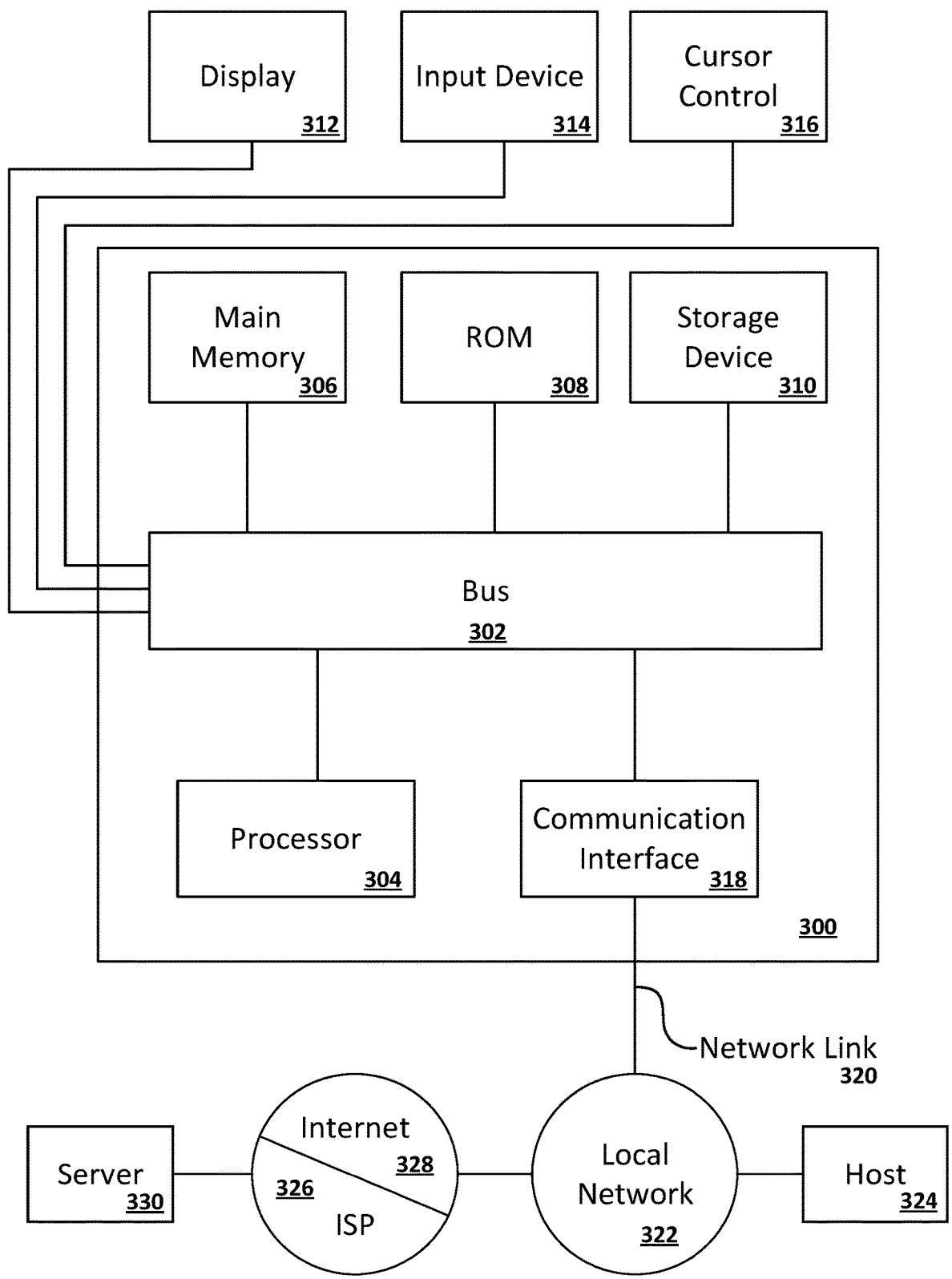
FIG. 3 shows a block diagram that illustrates a computer system in accordance with one or more embodiments.

For example, FIG. 3 is a block diagram that illustrates a computer system 300. An embodiment of the disclosure may be implemented upon the computer system 300. Computer system 300 may include a bus 302 or other communication mechanism for communicating information, and a hardware processor 304 coupled with bus 302 for processing information. Hardware processor 304 may be, for example, a general-purpose microprocessor.

Computer system 300 also may include a main memory 306, such as a random-access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 may further include a read-only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allow the device to specify positions in a plane.

Computer system 300 may implement the techniques described herein using customized hard-wired logic, one or more ASICs or FPGAs, firmware and/or program logic. The customized hard-wired logic, one or more ASICs or FPGAs, firmware and/or program logic, in combination with the computer system, causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media may include optical or magnetic disks such as storage device 310. Volatile media may include dynamic memory such as main memory 306. Common forms of storage media include a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media may include coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306. Processor 304 may retrieve and execute the instructions from the main memory 306. The instructions received by main memory 306 may optionally be stored on storage device 310 either before or after execution by processor 304.

Computer system 300 also may include a communication interface 318 coupled to bus 302. Communication interface 318 provides a two-way data communication coupling to a network link 320 that is connected to a local network 322. For example, communication interface 318 may be an integrated services digital network (ISDN) card, modem, cable modem, or satellite modem, to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic, or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the worldwide packet data communication network now commonly referred to as the "Internet" 328. Local network 322 and Internet 328 both use electrical, electromagnetic, or optical signals that carry digital data streams. Example forms of transmission media include the signals through the various networks, the signals through network link 320, and the signals through communication interface 318.

Computer system 300 can send messages and receive data, including program code, through the network(s), network link 320, and communication interface 318. In the Internet example, a server 330 might transmit a requested code for an application program through Internet 328, ISP 326, local network 322, and communication interface 318.

The received code may be executed by processor 304 as the code is received, and/or as the code is stored in storage device 310 or other non-volatile storage for later execution.

7. MISCELLANEOUS; EXTENSIONS

Embodiments are directed to a system with one or more devices that include a hardware processor and that are configured to perform any of the operations described herein and/or recited in any of the claims below. In an embodiment, a non-transitory computer-readable storage medium comprises instructions that, when executed by one or more hardware processors, causes performance of any of the operations described herein and/or recited in any of the claims.

In one or more embodiments, the systems described herein may include more or fewer components than the components described. The components described may be local to or remote from each other. The components described may be implemented in software and/or hardware. Each component may be distributed over multiple applications and/or machines. Multiple components may be combined into one application and/or machine. Operations described with respect to one component may instead be performed by another component.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of patent protection, and what is intended by the applicants to be the scope of patent protection, is the literal and equivalent scope of the set of claims that issue from this application, in the specific form that such claims issue, including any subsequent correction.

What is claimed is:

1. One or more non-transitory computer-readable media storing instructions that, when executed by one or more hardware processors, cause performance of operations comprising:
   generating a first secure element (SE) proxy application associated with an SE application installation file,
      wherein the SE application installation file comprises an executable component, and
      wherein the first SE proxy application comprises a first extension component;
   generating a first secure container associated with the first SE proxy application;
   deploying a first SE application object to the first secure container based on the first extension component,
      wherein the first extension component of the first SE proxy application extends the executable component of the SE application installation file;
   executing the first SE application object within the first secure container,
   wherein the first secure container comprises a first partition, wherein the first partition logically isolates the first secure container from one or more additional secure containers of an SE platform runtime environment.

2. The one or more non-transitory computer-readable media of claim 1, wherein the operations further comprise:
   generating a second SE proxy application associated with the SE application installation file, wherein the second SE proxy application comprises a second extension component;
   generating a second secure container associated with the second SE proxy application;
   deploying a second SE application object to the second secure container based on the second extension component,
      wherein the second extension component extends the executable component of the SE application installation file;
   executing the second SE application object within the second secure container,
      wherein the second secure container comprises a second partition, wherein the second partition logically isolates the second secure container from at least the first secure container.

3. The one or more non-transitory computer-readable media of claim 2,
   wherein executing the first SE application object corresponds to a first set of operations associated with a first tenant of a multi-tenant environment, and
   wherein executing the second SE application object corresponds to a second set of operations associated with a second tenant of the multi-tenant environment.

4. The one or more non-transitory computer-readable media of claim 2, wherein the operations further comprise at least one of:
   generating the second SE proxy application subsequent to generating the first SE proxy application;
   generating the second secure container subsequent to generating the first secure container or deploying the second SE application object subsequent to deploying the first SE application object.

5. The one or more non-transitory computer-readable media of claim 2, wherein the operations further comprise:
   terminating execution of the first SE application object;
   deleting the first SE application object from the first secure container;
   responsive at least in part to deleting the first SE application object from the first secure container: deleting the first secure container and deleting the first SE proxy application.

6. The one or more non-transitory computer-readable media of claim 5, wherein the operations further comprise:
   allocating a first set of memory blocks to the first SE proxy application,
      wherein the first SE proxy application occupies at least a portion of the first set of memory blocks;
   allocating a second set of memory blocks to the first secure container,
      wherein the first SE application object occupies at least a portion of the second set of memory blocks;
   subsequent to deleting the first secure container and the first SE proxy application:
      releasing a set of one or more memory segments comprising the first set of memory blocks and the second set of memory blocks.

7. The one or more non-transitory computer-readable media of claim 5, wherein the operations further comprise:
   subsequent to terminating execution of the first SE application object:
      generating a third SE proxy application associated with the SE application installation file, wherein the third SE proxy application comprises a third extension component;
      generating a third secure container associated with the third SE proxy application;
      deploying a third SE application object to the third secure container based on the third extension component,
         wherein the third extension component extends the executable component of the SE application installation file;
      executing the third SE application object within the third secure container,
         wherein the third secure container comprises a third partition, wherein the third partition logically isolates the third secure container from at least the second secure container.

8. The one or more non-transitory computer-readable media of claim 2, wherein the operations further comprise:
   receiving a command to delete the SE application installation file;
   responsive to receiving the command to delete the SE application installation file, deleting each of:
      (a) the first SE application object, the first secure container, and the first SE proxy application;

(b) the second SE application object, the second secure container, and the second SE proxy application; and (c) the SE application installation file.

9. The one or more non-transitory computer-readable media of claim 1, wherein the operations further comprise:
deploying a third SE application object to the first secure container based on the first extension component;
executing the third SE application object within the first secure container.

10. The one or more non-transitory computer-readable media of claim 9, wherein the operations further comprise:
terminating execution of the first SE application object;
deleting the first SE application object from the first secure container;
responsive at least in part to deleting the first SE application object from the first secure container:
refraining from deleting the first secure container and the first SE proxy application based at least in part on the third SE application object being deployed and/or executing within the first secure container.

11. The one or more non-transitory computer-readable media of claim 10,
wherein executing the first SE application object corresponds to a first set of operations associated with a first tenant of a multi-tenant environment, and
wherein executing the third SE application object corresponds to a second set of operations associated with the first tenant of the multi-tenant environment.

12. The one or more non-transitory computer-readable media of claim 1, wherein the operations further comprise:
receiving a first request to deploy a first instance of the executable component;
accessing a first instruction specifying deployment of the first instance of the executable component via an SE proxy application;
responsive to accessing the first instruction, generating at least one of: the first SE proxy application and the first secure container.

13. The one or more non-transitory computer-readable media of claim 12, wherein the first instruction is defined within the executable component, or wherein the first instruction is defined within the first request.

14. The one or more non-transitory computer-readable media of claim 12, wherein accessing the first instruction comprises:
transmitting a first query to a deployment mode module;
receiving the first instruction from the deployment mode module,
wherein the deployment mode module receives the first query and, responsive to receiving the first query, determines whether the first instance of the executable component is to be deployed via the SE proxy application based on a set of one or more criteria associated with the first request, and
wherein the deployment mode module outputs the first instruction responsive to determining that the first instance of the executable component is to be deployed via the SE proxy application.

15. The one or more non-transitory computer-readable media of claim 12, wherein the operations further comprise:
receiving a second request to deploy a second instance of the executable component;
accessing a second instruction specifying deployment of the second instance of the executable component directly from the SE application installation file to a second secure container;

responsive to accessing the second instruction:
deploying, directly from the SE application installation file to the second secure container, a second SE application object based on the executable component in the SE application installation file;
executing the second SE application object within the second secure container,
wherein the second secure container comprises a second partition, wherein the second partition logically isolates the second secure container from at least the first secure container.

16. The one or more non-transitory computer-readable media of claim 15, wherein the operations further comprise:
responsive to accessing the second instruction:
determining that the second secure container exists in an object memory of the SE platform runtime environment and is associated with the SE application installation file, and selecting the second secure container for deploying the second SE application object directly from the SE application installation file; or
determining that a secure container has yet to be generated for deploying the second SE application object directly from the SE application installation file, and generating the second secure container in the object memory of the SE platform runtime environment.

17. The one or more non-transitory computer-readable media of claim 1, wherein generating the first SE proxy application comprises:
generating the first extension component in the first SE proxy application; and
generating, in the first extension component, (a) a first class comprising an extension of a second class of the executable component and (b) a first install method comprising a redirect to a second install method of the executable component.

18. The one or more non-transitory computer-readable media of claim 1, wherein deploying the first SE application object to the first secure container based on the first extension component comprises:
accessing a set of methods of the executable component via the first extension component; and
instantiating the first SE application object based on an install method of the first executable component.

19. A method, comprising:
executing a secure element (SE) platform runtime environment on at least one SE hardware processor comprised in a first computing entity, wherein the SE platform runtime environment comprises instructions that, when executed by the at least one SE hardware processor, cause performance of the operations, comprising:
generating a first SE proxy application associated with an SE application installation file,
wherein the SE application installation file comprises an executable component, and
wherein the first SE proxy application comprises a first extension component;
generating a first secure container associated with the first SE proxy application;
deploying a first SE application object to the first secure container based on the first extension component,
wherein the first extension component of the first SE proxy application extends the executable component of the SE application installation file;
executing the first SE application object within the first secure container,
wherein the first secure container comprises a first partition, wherein the first partition logically isolates the first secure container from one or more additional secure containers of an SE platform runtime environment.

20. A system, comprising:
at least one secure element (SE) hardware processor associated with a first computing entity, wherein the at least one SE hardware processor comprises a SE platform configured to execute an SE platform runtime environment on the at least one SE hardware processor, wherein the SE platform runtime environment is configured to execute operations, using the at least one SE hardware processor, comprising:
generating a first SE proxy application associated with an SE application installation file,
  wherein the SE application installation file comprises an executable component, and
  wherein the first SE proxy application comprises a first extension component;
generating a first secure container associated with the first SE proxy application;
deploying a first SE application object to the first secure container based on the first extension component,
  wherein the first extension component of the first SE proxy application extends the executable component of the SE application installation file;
executing the first SE application object within the first secure container,
wherein the first secure container comprises a first partition, wherein the first partition logically isolates the first secure container from one or more additional secure containers of an SE platform runtime environment.

* * * * *